United States Patent [19]

Zinchuk

[11] 4,151,560
[45] Apr. 24, 1979

[54] APPARATUS AND METHOD FOR DISPLAYING MOVING FILM ON A TELEVISION RECEIVER

[75] Inventor: Michael Zinchuk, Waltham, Mass.

[73] Assignee: Polaroid Corporation, Cambridge, Mass.

[21] Appl. No.: 864,592

[22] Filed: Dec. 27, 1977

[51] Int. Cl.² .............................................. H04N 3/36
[52] U.S. Cl. .................................................... 358/214
[58] Field of Search ................................ 358/214–216, 358/54, 212, 213, 285, 130–132

[56] References Cited

U.S. PATENT DOCUMENTS

| | | | |
|---|---|---|---|
| 3,506,778 | 4/1970 | Gold | 358/206 |
| 3,803,353 | 4/1974 | Sanderson et al. | 358/54 |
| 3,883,756 | 9/1974 | Kumagai | 358/54 |
| 3,949,161 | 4/1976 | Fujishima | 358/54 |
| 3,952,328 | 4/1976 | Biber | 358/54 |
| 3,953,885 | 4/1976 | Biber | 358/54 |

Primary Examiner—John C. Martin
Attorney, Agent, or Firm—Edward S. Roman

[57] ABSTRACT

An apparatus and a method for displaying a motion picture film on a television receiver are disclosed. The apparatus employs several line scanners, each positioned to intercept a different portion of a viewing aperture across which the filmed motion picture is continuously moved. A synchronization control device sequentially activates the line scanners, and a storage device stores the scanner outputs to provide time conversion from the film scanning rate to the television field scan rate. A video generator provides video signals compatible with the television receiver from the information stored in the storage device. In a preferred embodiment, the television receiver is a standard, commercially available home television receiver, either in black and white or color.

13 Claims, 4 Drawing Figures

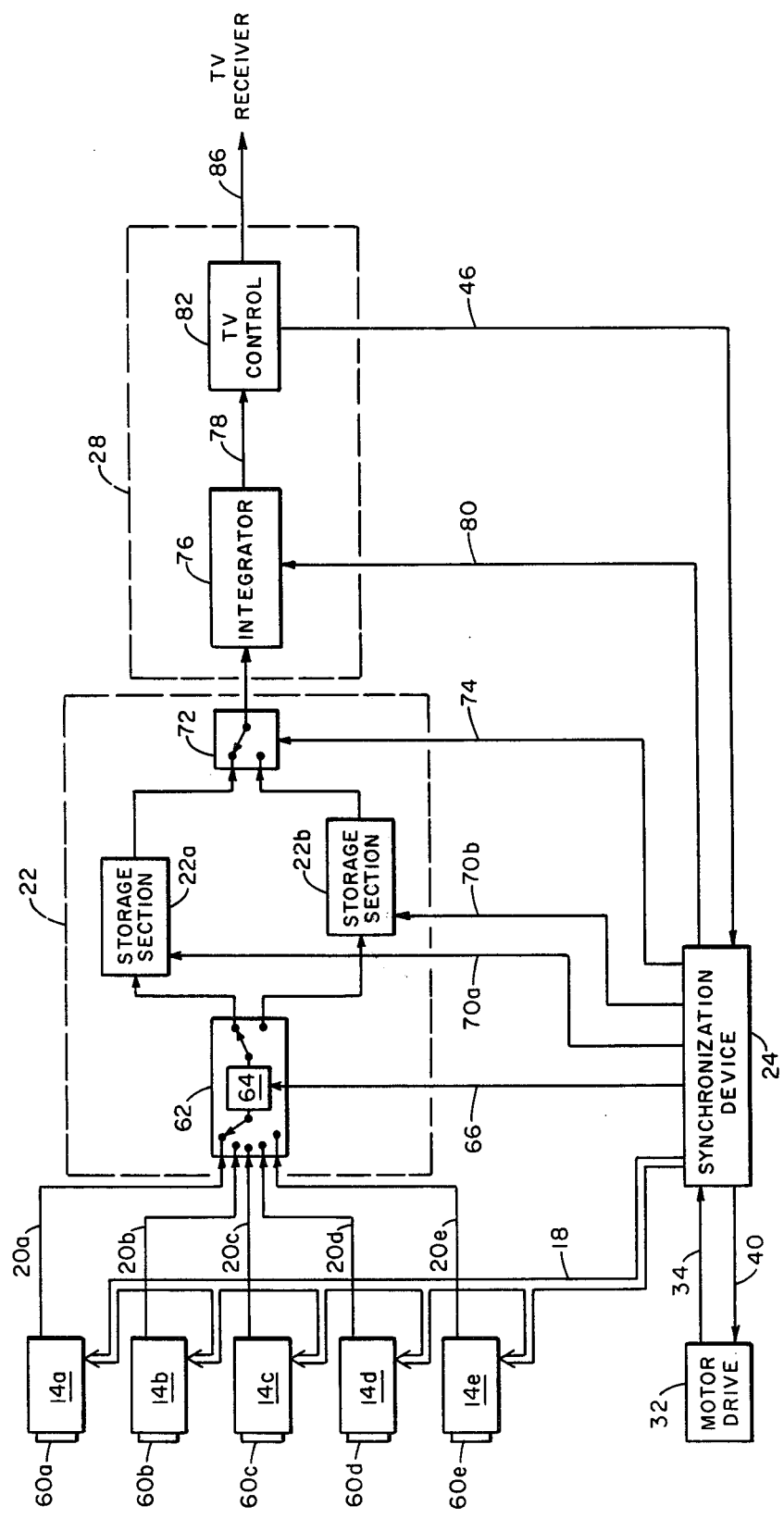

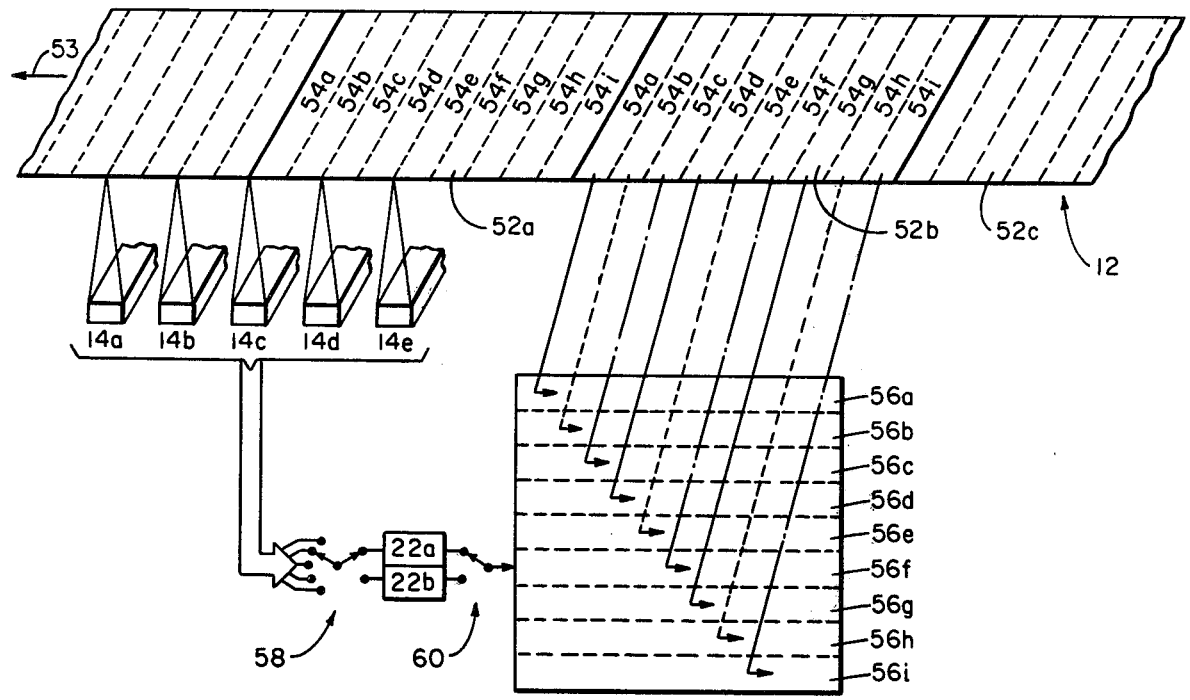

APPARATUS AND METHOD FOR DISPLAYING MOVING FILM ON A TELEVISION RECEIVER

BACKGROUND OF THE INVENTION

This invention relates generally to an apparatus and a method for displaying a motion picture film on a television receiver, and in particular provides apparatus and a method for displaying a continuously moving film strip on a standard commercial television receiver.

Equipment has long been available which enables a commercial television station to broadcast a motion picture film in either color or black and white in a format compatible for reception on the standard commercial home television receiver. The cost of this capability is high however, in terms of both the capital required for the equipment and the complexity of the synchronizing and scanning devices used.

The commercial systems typically broadcast motion picture film projected at a rate of twenty-four frames per second on a home television receiver having a raster scan rate of thirty complete frames (or sixty half-frame fields) per second. Conversion of the film frame rate to the television frame rate is achieved by scanning successive film frames different numbers of times. Thus, the conventional commercial equipment first scans one film frame twice and displays the film scans in two consecutive television fields. The equipment then scans the next film frame three times and displays those three scans in the next three television fields. The sequence then repeats for the next two film frames. Thus, the commercial equipment displays each pair of two successive film frames in five consecutive television fields. The specific equipment used in this approach, such as the flying spot scanner which has a moving spot-like illumination source, are discussed in more detail in "Television Engineering Handbook", edited by Donald J. Fink and published in 1957 by the McGraw-Hill Book Company, Inc.

A conventional commercial system of the foregoing type is relatively inflexible. More flexible and electronically simpler systems have been described (for example, in Biber, U.S. Pat. No. 3,952,328, issued Apr. 20, 1976) which display a motion picture film, advancing at an arbitrary frame rate, on a color television receiver by coupling the display apparatus directly to the television receiver. In this system, the display apparatus provides both vertical and horizontal deflection signals to the television receiver, so that the receiver is "slaved" to the display apparatus and hence to the film scanning apparatus. While this system is commercially acceptable, it requires modification of the electrical circuitry of the standard television receiver. Hence it is not a consumer item with wide market appeal, even for a typical amateur photographer of movie films.

The amateur photographer has nevertheless considered his home television receiver as a logical display mechanism for motion pictures and in particular home movies. However, low cost equipment for displaying motion pictures on a standard television receiver is not available.

It is therefore a principal object of this invention to provide a method and apparatus for displaying a motion picture on an unmodified standard television receiver. Other objects of the invention are to provide a method and apparatus which are simple in operation, reliable, and relatively low in cost. Further objects of the invention are to provide such apparatus which uses a relatively small number of storage devices, thereby maintaining low cost and, further, in which the film and the associated drive mechanism are the only moving elements.

SUMMARY OF THE INVENTION

The invention provides apparatus and a method for displaying successive frames of film, moving at a selected frame rate, on a television receiver operating with a selected field rate. Preferably, the field rate is equal to an integer multiple of the film frame rate.

The apparatus according to the invention features a plurality of photosensitive line scanners, each scanner having an array of photosensitive elements, e.g., photoelectric transducer elements. Typically, the elements in each scanner are arrayed linearly, e.g., in a row. A projector continuously moves the film strip, at the selected frame rate, relative to a positionally-fixed illumination source. The projector projects an image of the moving film through a viewing aperture and toward the photosensitive scanning arrays. The invention further features optical apparatus for simultaneously imaging selected portions of the film onto different ones of the scanning rays. The selected portions are positionally fixed sections of the film frame which extend transverse to the direction of the advance; typically the sections are non-overlapping and instead are equally spaced apart.

The invention further features a plurality of storage elements for storing signals from the line scanners, representing a portion of a film frame. In addition, a video generator processes the contents of a sequence of selectively connected storage elements to generate television transmission signals compatible with a standard television receiver. A synchronizing control unit activates the line scanners according to a first selected sequence, loads the storage elements from the line scanners according to a second selected sequence, and applies information signals to the video generator from the storage elements according to a third selected sequence. In this manner, the equipment scans at least an entire film frame and displays the image in an interleaved fashion on the television receiver. The viewer, however, is unaware of the interleaving and instead perceives a continuous display.

In a preferred practice of the invention, the film advances at a rate of twenty frames per second, the television field is scanned at a rate of sixty fields per second, the number of line scanners is five, and each storage element is capable of storing a representation of at least one-ninth of a film frame. A further preferred aspect of the invention is that the line scanners are positioned in a plane and receive images from sections of the viewing aperture which are spaced apart by two-ninths of a film frame.

The method of the invention features the steps of continuously moving the film strip relative to a projector having a projection aperture, and projecting an image of the moving film through the projection aperture towards a set of scanning arrays. Each array has a plurality of spaced apart, linearly positioned, photosensitive elements. Each array is located in optical alignment relative to the projector for receiving the image illumination passing through a linear section of the viewing aperture; the sections are equally spaced apart and positionally fixed. The method further features the steps of enabling the scanning arrays according to a first selected sequence, connecting the storage elements to the arrays according to a second selected sequence, and sequentially storing in the storage elements signals from the arrays and representing a portion of the film frame. The method also features connecting a video generator to the storage elements according to a third selected sequence, and generating from the stored signals a television transmission signal compatible with the television receiver. Upon the completion of the selected sequences with these steps, at least an entire film frame is scanned and displayed in an interleaved fashion on the television receiver.

The foregoing features of the invention yield equipment that displays motion picture film on a conventional television receiver and that has significant economy. The features enable the film to advance at a rate different from the television scan rate; and yet they free the equipment from costly requirements of sufficient storage elements to store at one time information representing a full frame. Instead, the equipment operates with significantly lesser storage elements. To obtain this objective, the equipment utilizes the scanning arrays and the storage elements on time-shared basis according to multiple sequences. Thus, according to a first sequence, the arrays are selectively activated to scan sections of the film frame in a time sequence compatible with the television display. The signal outputs of the respective arrays are loaded into storage elements selected according to a second sequence, and the storage elements are read out according to a third sequence at a rate compatible with the television field scan.

DESCRIPTION OF THE DRAWINGS

These and other objects, features, and advantages of the invention will appear from the following description of a preferred embodiment of the invention taken together with the drawings, in which:

FIG. 2 is a more detailed electrical schematic block diagram of a preferred embodiment of the electrical circuitry according to the invention;

FIG. 3 is a diagrammatic representation of the scanning steps according to the illustrated preferred embodiment of the invention; and FIG. 4 is a tabulation of the selected sequences by which each film section is displayed according to the illustrated preferred embodiment of the invention.

DESCRIPTION OF A PREFERRED EMBODIMENT

Figure 1:
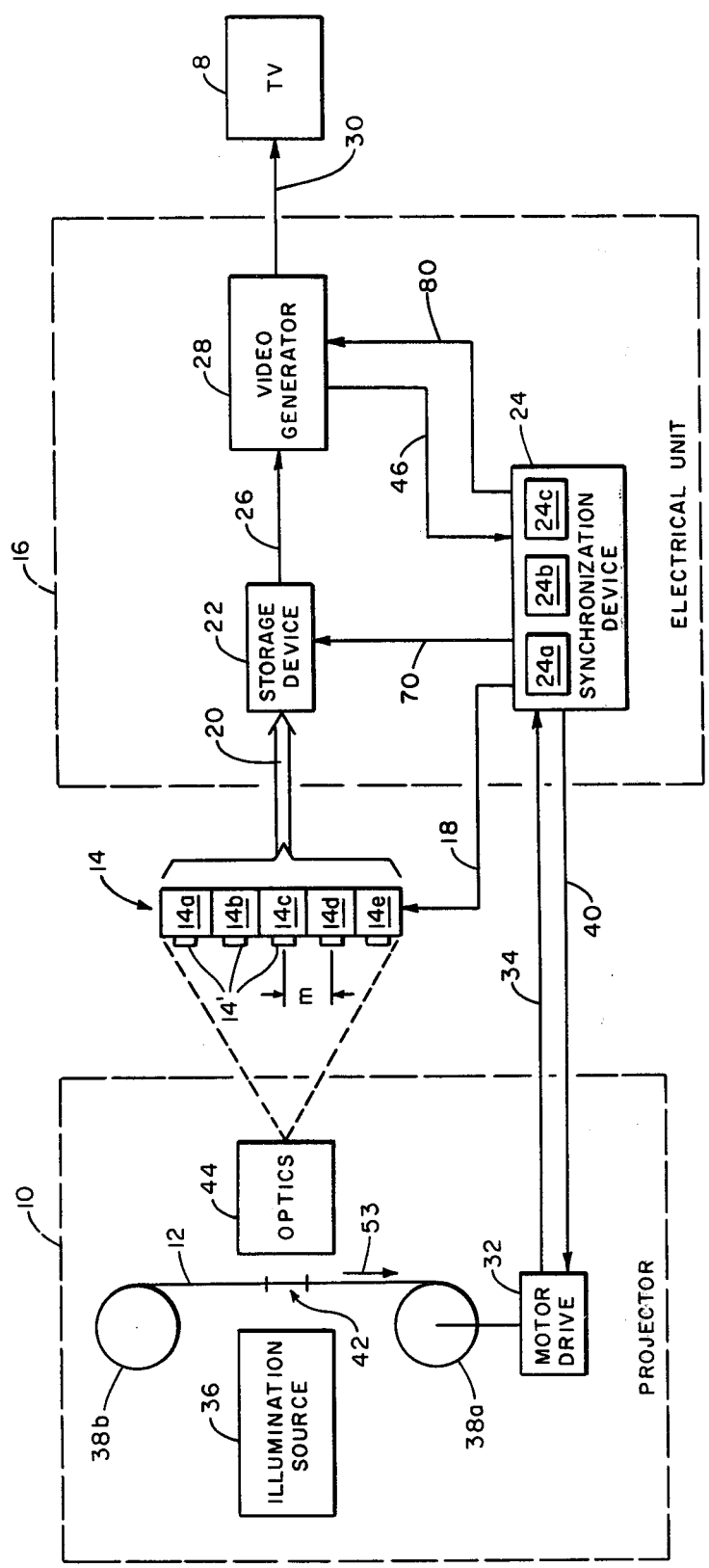
FIG. 1 is a schematic diagram of display equipment according to the invention.

Referring to FIG. 1, equipment for displaying successive frames of a moving strip of film on a television receiver 8 has a projector 10 for directing an image of the moving film 12 toward a plurality of photosensitive line scanners 14. The line scanners, when selectively activated by an electrical unit 16 over lines 18, provide output signals over lines 20 representative of the moving film image. The electrical unit 16 has a storage device 22 for temporarily storing the information from the scanners 14. A synchronization control device 24 controls this and other operations. The storage device 22 applies its contents over lines 26 to a video generating device 28 which generates, from the stored electrical signals, an output signal which is compatible with the television receiver 8. The illustrated television receiver 8 is a standard black and white or color commercial television set. Typically, an unused channel of the television receiver is selected for displaying the motion picture.

The electrical unit 16 operates in synchronism with the movement of the strip of film 12 in the projector 10. A film drive motor 32 in the projector provides the requisite synchronizing signals over a line 34 to the electrical unit 16, and in particular to the control device 24. The control device 24, however, controls the rotational speed and phase of drive motor 32 over lines 40.

The projector 10 has an illumination source 36 and film take-up and supply spools 38a and 38b. Drive motor 32 provides continuous rotational drive to take-up spool 38a so that the film strip 12 is continuously moved at a selected film frame rate past the positionally fixed illumination from the source 36. The illumination source 36 projects light through the moving film strip 12 onto a projector viewing aperture 42. An optical focusing system 44 collects the illumination directed through the film at the aperture and images it onto a set of line scanners 14 with selected focus.

The line scanners, of which five are shown designated 14a, 14b . . . 14e, are preferably arranged parallel to one another in the same plane. The illustrated scanners have scanner photosensitive apertures 14' and are spaced apart from one another by a distance (m) so that each intercepts the image of a selected portion of the projector viewing aperture. The selected image portions are equally spaced apart and positionally fixed sections of the viewing aperture; the sections extend transverse to the direction of film 12 advance, i.e., they extend perpendicular to the plane of the FIG. 1 drawing. In the illustrated embodiment, the spacing (m) between the line scanners 14 corresponds, when translated back to the viewing aperture 42, to a distance equal to two-ninths of a film frame. That is, when projected to the aperture, the spacing (m) is two-ninths of the length of each film frame, as measured in the direction of film advance, plus one inter-frame gap. The reasons for this choice of spacing are specified below.

As noted above, the electrical unit 16 of the display equipment includes the synchronizing control device 24, storage device 22, and the video generator 28. In the illustrated embodiment, the control device 24 responds to signals over lines 34 from the projector 10, and in particular from the film drive motor 32, and to signals from the video generator 28 over a line 46. The operation of the control device 24 in response to these signals is to activate the line scanners 14 according to a first selected sequence, load the storage device 22 from the line scanners according to a second selected sequence, and transfer information signals stored in the storage device 22 to the video generator 28 according to a third selected sequence. With these operating sequences and as described further below, the display equipment displays at least an entire film frame on the television receiver 8.

Referring to FIGS. 3 and 4, the display equipment of FIG. 1 operates as follows. Conceptually, each illustrated film frame image 52 and one contiguous inter-frame gap of the film strip 12 (moving in the direction of the arrow 53) are divided into nine equi-sized contiguous sections 54a, 54b . . . , 54i. Each section 54 extends across the width of the moving film and has a height, in the direction of film movement, equal to one-ninth of the distance between corresponding points on successive film frames. In the illustrated embodiment of the invention, the film frame rate is twenty frames per second and, as is well known, the standard television receiver field rate, in which two fields constitute a full frame, is sixty fields per second. Further, there are five line scanners.

As noted above, the line scanners 14a, 14b, 14c, 14d, 14e, are equally spaced apart; and in the illustrated embodiment they intercept the image of the viewing aperture at transverse portions which are spaced apart by two-ninths of a film frame. With the position of the moving film 12 relative to line scanners 14 as shown in FIG. 3, the apparatus begins a film-scanning sequence by scanning film frame 52a. First, the synchronization device 24 activates scanner 14c, which scans a first section 54a of the film frame 52a as the film moves by that scanner. The resulting analog data, i.e. the information signal from scanner 14c which represents the received light as described below, is temporarily stored in the storage device 22. The selection of both scanner 14c and the location in the storage device 22 for storing signals representative of section 54a are schematically represented in FIG. 3 by the two independent switch wipers of a multiposition switch 58.

The scan of section 54a takes place in one-ninth of the time required to move the film strip a complete frame, e.g., takes place in 1/180 second. Two events occur during the time corresponding to the next, second, one-ninth of a film frame (the next 1/180 second). Next, scanner 14d is activated by the synchronization device, and scans the film section labelled 54d. The measured data is stored in storage device 22. In addition, the television receiver initiates a field scan and displays, in the first one-ninth section 56a of the television raster scan, the data in storage device 22 and representative of film section 54a. A switch 60, controlled by the synchronization device 24, schematically represents the circuitry which selects the portion of storage device 22 to be read. The time required to display film section 54a at television section 56a is one-ninth of a field scan or 1/540 second. Thus storage device 22 is typically repetitively loaded at one rate and is unloaded, in spurts, at a second faster rate.

The illustrated storage device 22 preferably has two storage sections, 22a and 22b, as FIG. 2 shows. Each storage section is capable of storing line scanner data representing a film section 54. With this arrangement, storage section 22a stores data from film section 54a during the first 1/180 second of a scanning sequence, and during the next 1/180 second of the sequence the other storage section 22b stores data from film section 54d while the first storage section 22a reads out its data to the video generator 28. During the next or third one-ninth advance of a film frame, the synchronization device activates line scanner 14e to scan film section 54g. At the beginning of the scan of section 54g, storage section 22a is empty and is available to store the output of line scanner 14e. As the storage section 22a stores the output of line scanner 14e, the other storage section 22b reads out its stored data onto the television raster display at section 56d through the video generator.

Referring to FIG. 4, the illustrated synchronization device controls the scanning arrays 14c, 14d, 14e, 14b, 14c, 14d, 14a, 14b, 14c in that order to scan the sections 54 of film frame 52 in the following sequence: film sections 54a, 54d, 54g, 54b, 54e, 54h, 54c, 54f, 54i, respectively. This corresponds to the first of the above described sequences. The synchronizing control device 24 includes the mechanisms for performing the switching functions of connecting the scanner 14 with the storage device 22 as schematically represented by switch 58, the selection of the particular storage sections being made according to the second sequence, and of connecting the storage device 22 with the video generator according to the third sequence as schematically represented by switch 60.

Thus, during each field of the television scan, the equipment displays three spaced apart sections of a film frame on the television receiver 8. At the end of each such group of three television field scans, an entire film frame will be displayed, in an interleaved fashion; with the sections of the film being substantially reconstructed as a nine section or nine element mosaic. Typically, the selected sequences used in the illustrated embodiment and summarized in FIG. 4 can and will change depending upon the film frame rate, the television field rate, and the available storage. However, the first sequence will always designate activation of the scanners 14 in a sequence which will scan sections of the film frame in a time sequence compatible with the television display; the second sequence will designate loading of the storage sections so that the next storage section will have been emptied before loading; and the third sequence will always designate unloading of the storage sections in the same order as they are loaded. Thus, in other embodiments of the invention, there may be more or fewer line scanners and storage elements, and the field rate need not be an integer multiple of the film frame rate.

The synchronizing control device 24 contains the electrical circuitry for implementing the selected activation and connection sequences described above. Before further discussing the operation of the illustrated control device 24, other elements of the electrical unit 16, and the illustrated line scanners 14, are described in greater detail.

Referring to FIG. 2, each line scanner 14a, 14b, . . . has a plurality of lineally arranged and spaced apart photosensitive elements, and each has a photosensitive surface 60a, 60b, . . . directed toward the incoming illumination. A particularly useful scanner employs charge-coupled devices as the photosensitive elements; one such product is the solid state line scanner manufactured by Reticon Corporation of Sunnyvale, California under the name "C Series Solid State Line Scanners". In the Reticon scanner, each photosensitive element is connected in parallel with an integrating capacitor and the scanned output is a sequence of pulses, each pulse being representative of the light impinging upon the corresponding photosensitive element. In a typical television application, a line scanner having 512 separate photosensitive elements, positioned on two mil centers (such as Reticon RL-512C), provides the required scanning resolution for adequate picture detail.

The illustrated line scanners 14 are sensitive to the impinging or received light energy. A train of phase related clock signals from the synchronization device, applied over lines 18, activates the line scanners one at a time according to the selected sequence noted in connection with FIGS. 3 and 4. The illustrated synchronization control device has pulse clock synchronization circuitry 24a for generating the line scanner activation signals over lines 18, a system synchronizing unit 24b for synchronizing the operation of the display equipment, and a sequencing element 24c for activating the line scanners and for directing storage and readout of a storage section 22a, 22b. The synchronization circuitry 24a and the sequencing element 24c operate in response to synchronization signals from the synchronizing unit 24b.

The illustrated pulse clock synchronization circuitry 24a employs a Reticon type RC400A "motherboard" circuit. The Reticon circuit provides the necessary phases of the clock signal and the start pulses for driving the illustrated Reticon line scanners 14. Although a separate RC400A circuit board can be used for each line scanner, a single circuit board whose output is gated by the sequencing element 24c to selectively operate the scanners is preferred because this arrangement simplifies synchronization between the line scanners.

FIG. 2 shows that the illustrated storage device 22 includes multiplexers 62 and 72. The multiplexer 62, corresponding to switch 58 of FIG. 3, connects the outputs of the scanners, over lines 20a, 20b, . . . , 20e, according to the selected activating sequence to one of the storage sections 22a, 22b. Preferably, multiplexer circuit 62 includes a driver amplifier 64, as illustrated, to substantially isolate the activated line scanner from external loading by the storage device. The driver amplifier is, for example, a Reticon type RC404 driver amplifier which provides at its output a pulse signal of sufficient power to drive a storage section. The driver amplifier is generally necessary because each scanner provides at its output substantially a "packet of charge" (a pulse signal) which is the output of the connected photosensitive element in parallel with a partially discharged capacitor. (The voltage across the parallel combination of the photosensitive element and the corresponding capacitor measures the integral of the light intercepted by the respective element during a known scanning time.)

Multiplexer 62 thus selectively connects the output of the driver amplifier 64 to one or the other of the storage sections 22a, 22b, according to a second selected sequence as determined by control signals it receives on lines 66 from the sequencing element 24c. As a result, one storage section 22a or 22b stores signals representing, in the illustrated embodiment, one-ninth of a film frame.

Each illustrated storage section 22a, 22b includes a plurality of type CCD-311, 130/260 bit analog shift registers, manufactured by Fairchild Semiconductor Corporation of Mountainview, California. Each storage section has a sufficient number of the analog shift registers to store signals representing, in the illustrated embodiment, substantially about one-ninth of a film frame. In the illustrated embodiment, this corresponds to approximately sixty CCD-311 registers. Signals from the system synchronization unit 24b over lines 70a, 70b synchronize these analog shift registers with the output signals of the line scanners.

As noted above, after a storage section 22a or 22b has received signals representing one-ninth of a film frame, the multiplexer 62 switches to another line scanner 14 for input data, and changes its output gating to load the other storage section. While the second or "other" storage section is being loaded, the multiplexer 72, under control with signals on lines 74 from the sequencing element 24c applies signals from the first storage section to the video generator 28. Signals over lines 70a or 70b effect a data read-out from one storage section, according to the third sequence noted above, to the video generator 28 at a rate compatible with the television field scan.

Although disclosed as part of the storage element 22, either multiplexer 62 and 72 can be provided as part of another element of the FIG. 2 equipment; for example both multiplexers can be part of the synchronization control device 24.

The video generator 28 converts the signals received from a storage section into a substantially "boxcar" type signal using an integrator 76 having an output (over lines 78) compatible with the video input of a television control signal generator 82. Integrator 76, for example a type OEI 9081 manufactured by Optical Electronics, Inc. of Tucson, Arizona, has a charge amplifier with a reset switch and connected with a capacitive feedback element to provide the integration function, and a following sample-and-hold element. Thus the capacitive feedback configuration of the charge amplifier implements an integrating function and provides at the integrator output, over lines 78 and under the timing control of signals over lines 80 from the system synchronizing unit 24b, a processed video signal. A television signal generator 82, which can for example be based on commercially available equipment such as a Heathkit type IG-5240 color alignment generator, provides an output video signal (on a selected television channel), over lines 86, which is compatible with a standard television format. Synchronizing signals from the generator 82 over lines 46 provide the basic timing signals for the system synchronizing unit 24b and hence for the entire system operation.

As a result, the plurality of line scanners 14 scan each film frame in non-contiguous portions, or sections, and the resulting display on the television screen is a mosaic composed of a plurality of full field scans, three fields in the illustrated embodiment.

While the invention has been described in somewhat specific terms using specific, preferred, commercially available devices arranged in a particular preferred configuration, the invention is neither limited to the preferred embodiment nor is it limited to the particular devices described herein. Thus, other line scanners having different output signals, other types and configurations of storage elements, and different synchronization control circuits can be employed within the scope of the invention and the following claims. In addition, other configurations and numbers of line scanners can be used, and there is a trade-off between the number of line scanners, the complexity of the synchronization control system, and the amount of storage which is needed.

Furthermore, in other embodiments of the invention, the optical system 44 and/or the geometrical configuration of the equipment may require that the line scanners be placed in a non-planar configuration wherein mirrors, prisms, or other means direct the moving film image to each line scanner. In such a non-planar configuration, the electronics would however remain conceptually the same as that described with respect to the preferred illustrated embodiment.

Thus, other embodiments of the invention, including additions, subtractions, deletions and other modifications of the preferred embodiment of the invention will be obvious to those skilled in the art and are within the scope of the following claims.

What is claimed is:

1. Apparatus for converting the video information from a multi-frame transparent film strip to a television transmission signal suitable for receipt by a conventional television receiver which can display the video information derived from the film strip, said apparatus comprising:

a plurality of parallel, spaced apart, line scanners, each having an elongated linear array comprising a plurality of photosensitive elements for converting video information to electrical signal information;

means for defining a select aperture corresponding in size generally to one frame of the film strip;

means for moving the film strip past said aperture at a generally uniform rate of speed in a direction transverse to the length of said line scanners;

means for storing electrical signals from said line scanners;

means for converting said stored electrical signals to a television transmission signal suitable for transmission to a television receiver in order to display the video information received by said line scanners; and control means for activating individual ones of said line scanners in a select sequence such that each line scanner receives only a portion of the video information from each film frame as the film is moved past said aperture with substantially all of the video information from each film frame ultimately being received by said line scanners during said select sequence, for controlling the transmission of said electrical signal information from said line scanners to said storing means as a functional relationship of said select sequence and for controlling the transmission of said stored electrical signal information to said converting means in another select sequence conpatible with the field rate of the conventional television receiver.

2. The apparatus of claim 1 wherein said storing means comprises two storing sections and said control means operates to activate said line scanners, one at a time, in said select sequence and to control the transmission of electrical signal information from each sequentially activated line scanner in a manner such that only one of said storing sections receives electrical signal information at a time from each activated line scanner with the transmission of electrical signal information to any one of said storing sections being changed to the other of said storing sections in correspondence with each change in activation from one of said line scanners to the next of said line scanners in said select sequence.

3. The apparatus of claim 2 wherein said control means further operates to sequentially control the transmission of stored electrical signal information from each of said storing sections to said converting means in correspondence to the other of said storing sections receiving electrical signal information from an activated one of said line scanners.

4. The apparatus of claim 3 wherein each storing section comprises an analog shift register.

5. The apparatus of claim 3 wherein said plurality of line scanners comprise five equidistantly spaced apart line scanners and said period of activation for each of said line scanners is selected in correspondence with the speed of the film strip in said projecting means so that each of said line scanners scans one ninth of the video information of each film strip frame during each period of its activation and each of said storing sections is capable of storing at least the electrical signal information representative of the video information from one ninth of the film frame.

6. The apparatus of claim 5 wherein said five line scanners are arranged in order of first through fifth and said select sequence is determined in order to activate each line scanner in the order of third, fourth, fifth, second, third, fourth, first, second and third.

7. The apparatus of claim 1 wherein the film strip is moved in said projection means at substantially the rate of twenty frames per second and the field rate of the conventional television receiver is sixty frames per second, said control means thereby operating to control the transmission of said stored electrical signal information to said converting means in a sequence such that substantially the entire video information content from one frame of the film strip can be displayed in three consecutive fields of the ordinary television receiver.

8. A method for converting the video information from a multi-frame transparent film strip to a television transmission signal suitable for receipt by a conventional television receiver which can display the video information derived from the film strip comprising the steps of:

aligning a plurality of line scanners, each being of the type comprising an elongated linear array having a plurality of photosensitive elements for converting video information to electrical signal information, in parallel spaced apart relation with respect to each other;

moving the film strip past an aperture which corresponds in size generally to one frame of the film strip at a generally uniform rate of speed in a direction transverse to the length of said line scanners;

projecting an image of the film strip defined by the aperture onto said plurality of photosensitive line scanners as the film is moved past the aperture;

activating individual ones of said line scanners in a select sequence so that each line scanner receives only a portion of the video information from each film frame as the film is moved past the aperture with substantially all of the video information from each film frame ultimately being received by said line scanners during said select sequence;

storing the electrical signals from said line scanners in a controlled manner as a functional relationship of said select seqence; and controlling the transfer of the stored electrical signal information in another select sequence compatible with the field rate of the conventional television receiver and converting the electrical signal information so transfered to a television transmission signal suitable for transmission to a television in order to display the video information received by said line scanners.

9. The method of claim 8 wherein the electrical signals from said line scanners are stored in two distinct storing sections, and wherein said line scanners are activated, one at a time, in said select sequence and the transmission of electrical signal information from each sequentially activated line scanner is controlled so that only one of said storing sections receives electrical signal information at a time from each activated line scanner with the transmission of electrical signal information from any one of said storing sections being controlled to change to the other of said storing sections in correspondence with each change in activation from one of said line scanners to the next of said line scanners in said select sequence.

10. The method of claim 9 wherein the transfer of electrical signal information from each of said storing sections is controlled to occur in correspondence with the other of said storing sections receiving electrical signal information from an activated one of said line scanners.

11. The method of claim 10 wherein said line scanners are arranged as five linear arrays equidistantly spaced apart and the period of activation for each of said line scanners is selected to correspond with the speed of the film strip so that each of the line scanners scans one ninth of the video information of each film frame during each period of its activation whereupon the electrical signal information representative of the video information from each one ninth of a scanned film frame is stored in one of said storing sections.

12. The method of claim 11 wherein said five line scanners are arranged in order of first through fifth and said select sequence is determined in order to activate each line scanner in the order of third, fourth, fifth, second, third, fourth, first, second and third.

13. The method of claim 8 wherein the film strip is moved at the rate of twenty frames per second and the field rate of the conventional television receiver is sixty frames per second, and the transfer of stored electrical signal information is controlled so that substantially the entire video information content from one frame of the film strip can be displayed in three consecutive fields of the ordinary television receiver.

* * * * *